R. B. McMULLEN.
METAL WHEEL CONSTRUCTION.
APPLICATION FILED FEB. 23, 1915.

1,161,491.  Patented Nov. 23, 1915.

Witnesses:
Anna J. Cohen
Louise Baumann

Inventor:
Roger B. McMullen,
by Charles O. Hervey
his attorney.

UNITED STATES PATENT OFFICE.

ROGER B. McMULLEN, OF EVANSTON, ILLINOIS, ASSIGNOR OF ONE-HALF TO P. J. O'KEEFFE, OF CHICAGO, ILLINOIS.

METAL WHEEL CONSTRUCTION.

1,161,491. Specification of Letters Patent. Patented Nov. 23, 1915.

Application filed February 23, 1915. Serial No. 9,781.

*To all whom it may concern:*

Be it known that I, ROGER B. McMULLEN, a citizen of the United States, and a resident of Evanston, county of Cook, and State of Illinois, have invented certain new and useful Improvements in Metal Wheel Constructions, of which the following is declared to be a full, clear, and exact description.

This invention relates to metal wheel constructions, and its primary object is to strengthen wheels of this class without increasing their weight, and to provide a metal wheel wherein the danger of the rim portion breaking away from the body of the wheel is positively eliminated.

In metal wheels which employ a T shape, inner rim or felly portion, and spokes extending therefrom to the hub portion, considerable difficulty has been encountered in satisfactorily securing thereto the tire holding rim. Ordinarily, the rim has been shrunk thereon, and sometimes welded, riveted or spot-welded to the T-shaped inner rim or felly. The particular disadvantage in the old construction consists in the fact that when subjected to side pressure, as for instance, when the wheel is run against or along a curbstone, the rim is pried loose from the body of the wheel. This of itself is a fatal defect in metal wheels. I have overcome this objection by letting the T-shaped, inner rim into a groove on the inner face of the tire holding rim, so that the side edges of the T-shaped rim abut against the marginal or side edges of the groove, whereby it is firmly held therein.

To such ends, this invention consists in the several novel features of construction fully described in the following specification and particularly pointed out in the claims.

Figure 1:
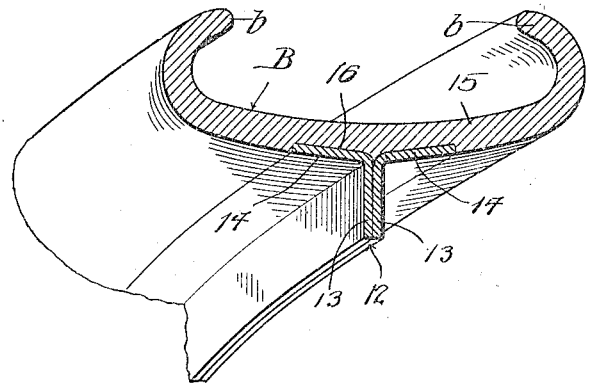
Figure 2:
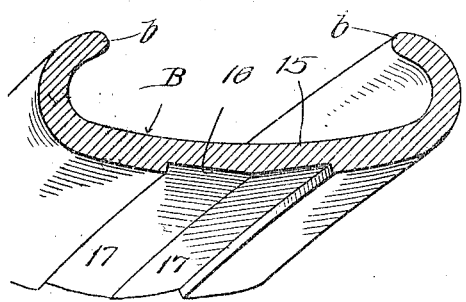
Figure 3:
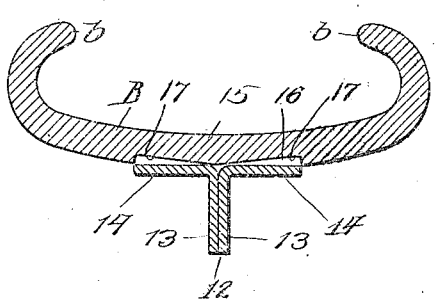
Figure 4:
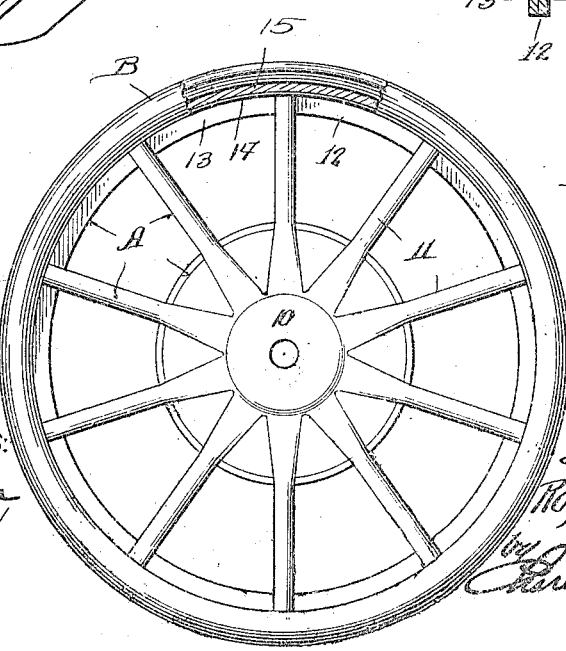

The invention is clearly illustrated in the accompanying drawing, in which:

Figure 1 is a perspective view of a fragment of a metal wheel construction embodying a simple form of the present invention; Fig. 2 is a perspective view of a fragment of the rim detached from the body portion of the wheel; Fig. 3 is a detail, axial section through the rim and wheel body showing the parts as they appear prior to the final assemblage thereof; and Fig. 4 is a side elevation of the complete wheel.

In the embodiment of the invention illustrated in said drawing, A designates a metal wheel body having the usual hub portion, 10, spokes, 11, radiating therefrom to a T-shaped felly or inner rim portion, 12. Conveniently, said body portion may comprise two similar sheet metal halves, each struck up from sheet metal to provide the central hub portion, spoke portions radiating therefrom, and a felly or inner rim portion, having the shape of a right angle in cross section. The spoke portions of one section are stamped up into tubular form and are closely enveloped within the tubular spoke portions of the other section, and the vertical webs, 13, of the rim sections placed back to back with the horizontal webs, 14, projecting laterally therefrom, as shown. Preferably, the wheel body is reinforced to strengthen the same. A metal wheel body of this type is fully described and illustrated in the Turner Patent No. 978,516, dated December 13, 1910, and in the pending application of Paul C. Venske, filed October 7, 1914, Serial No. 865,480, where a simple and efficient reinforcement is shown.

In constructing the wheel body for the present wheel, the horizontal flanges, 14, are initially formed to lie in alinement with each other and at right angles to the vertical web portions, 13.

The tire holding rim is shown at B, and may be constructed in accordance with any of the well-known forms of rims for receiving pneumatic or other tires, the one shown comprising the well-known type for detachable clencher, pneumatic tires, having the rounded overhanging edges, *b, b*.

Preferably the rim is rolled to provide a central or body portion, 15, having a long radius curve in cross section, but this is immaterial, as any desired cross section of rim may be used in this wheel construction. The rim is, however, rolled or formed with an annular groove, 16, on its inner face, for the reception of the inner, T-shaped rim or felly of the wheel body, the base, 17, 17, of said groove sloping back at both sides of a median, high or crown point or line, as best shown in Fig. 2. Said high or middle line of the groove may, if desired, constitute the smallest diameter of the rim and should be approximately the same diameter as the greatest diameter of the wheel body. From this median line the base of the groove slopes back on each side thereof, a distance equal to the width of one horizontal web, 14, its depth at the side edges being equal to the thickness of said web. In the assembled wheel, said horizontal webs, 14, are pressed into and seated in said groove with their marginal edges abutting against the marginal edges of the grooves as shown.

In assembling a wheel body and rim built in accordance with the present invention, the rim, B, is placed around the wheel body, A, as shown in Fig. 3, with the high point of the base of the groove contacting with the abutting edges of the two horizontal webs, 14. If desired, it may be shrunk on so as to insure a tight fit. The horizontal webs, 14, are then forced down into the groove by a suitable expanding mandrel (not shown), until their exposed faces are flush with the adjacent or inner face of the rim, B, their marginal edges firmly contacting with the marginal edges of the groove. If desired the rim and inner rim or felly, may then be welded, riveted or spot-welded together, as desired.

It is to be observed that the strength of the wheel is materially increased at the joint between the wheel body and rim; that by reason of the abutting portions, the possibility of the inner rim portion or felly being torn loose from the rim is practically eliminated; that the rim and inner T rim become to all intents and purposes, an integral part capable of withstanding all of the rough usage to which wheels of this class are subjected in use. Furthermore, it is to be observed that the wheel may be painted or enameled, as usual, and that the joints between the rim and felly will be covered.

More or less variation of the exact details of construction is possible without departing from the essence of this invention. I desire, therefore, not to limit myself to the exact form of construction shown and described, but intend in the following claims to point out all of the invention disclosed herein.

I claim as new and desire to secure by Letters Patent:

1. In a metal wheel construction, a wheel body having a T-shaped, inner rim or felly, and a tire holding rim having an annular groove in its inner face for the reception of one member of said T-shaped, inner rim or felly; the base of said groove having two angularly disposed faces sloping back from a median line, and the head of the T-shaped, inner rim or felly fitting tightly against the base of said groove.

2. In a metal wheel construction, a metal wheel body having a T-shaped, inner rim or felly, and spoke members integral therewith, and a tire receiving rim surrounding said body and having an annular groove in its inner face for the reception of the head of said T-shaped inner rim or felly, the base of said groove having the form of a wide angle, V-shaped formation in cross section, with the apex of the V at the smallest diameter of the rim, and said head of the T-shaped, inner rim or felly conforming to and fitting tightly against the face of said groove.

3. In a metal wheel, a metal wheel body having spokes, and an inner rim or felly at the ends thereof formed of two ring-like members of angle iron formation in cross section, placed back to back so as to form an inner rim of substantially T-shape, and a tire holding rim surrounding said inner rim and formed with an annular groove in its inner face, the base of said groove having two sloping faces extending back from a median line, and two webs of said inner rim being tightly seated against the faces of said groove, with their marginal edges pressing tightly against the marginal edges of the groove.

ROGER B. McMULLEN.

Witnesses:
CHARLES O. SHERVEY,
ANNA J. COHON.